United States Patent
Bugatti

(10) Patent No.: US 6,276,662 B1
(45) Date of Patent: Aug. 21, 2001

(54) VALVE OR TAP WITH BLOCKING DEVICE FOR THE STOPPER

(75) Inventor: Vittorio Bugatti, Lumezzane (IT)

(73) Assignee: Valvosanitaria Bugatti S.P.A. (IT)

( * ) Notice: Subject to any disclaimer, the term of this patent is extended or adjusted under 35 U.S.C. 154(b) by 0 days.

(21) Appl. No.: 09/567,620

(22) Filed: May 9, 2000

(30) Foreign Application Priority Data

Jun. 18, 1999 (IT) .................................................. BS99A062

(51) Int. Cl.⁷ .................................................. F16K 35/00
(52) U.S. Cl. .................................. 251/95; 251/93; 251/96; 251/288
(58) Field of Search .................................. 251/92, 93, 95, 251/96, 286, 288

(56) References Cited

U.S. PATENT DOCUMENTS

| | | | |
|---|---|---|---|
| 292,824 | * | 2/1884 | Kennedy . |
| 2,035,762 | * | 3/1936 | Roberts . |
| 3,010,693 | * | 11/1961 | Lamar . |
| 4,813,455 | * | 3/1989 | Iqbal ................................. 137/625.17 |
| 5,236,006 | * | 8/1993 | Platusich et al. ..................... 137/375 |
| 5,246,200 | * | 9/1993 | Barker ................................... 251/148 |
| 6,170,799 | * | 1/2001 | Nelson .................................... 251/96 |

* cited by examiner

*Primary Examiner*—Kevin Shaver
*Assistant Examiner*—D A Bonderer
(74) *Attorney, Agent, or Firm*—McGlew and Tuttle, P.C.

(57) ABSTRACT

The invention concerns a valve or tap for fluids, with a stopper that rotates controlled by a control rod equipped with a throttle or grip lever fixed to said rod by means of a fastening screw. The throttle or grip lever has at least one blocking notch (19, 20), designed to fit tightly with a catch (18), which is part of the valve body in order to prevent the stopper from turning. The fastening screw (15) has a special head that allows it to be screwed/unscrewed only with a specific wench or tool, thereby preventing tampering.

6 Claims, 4 Drawing Sheets

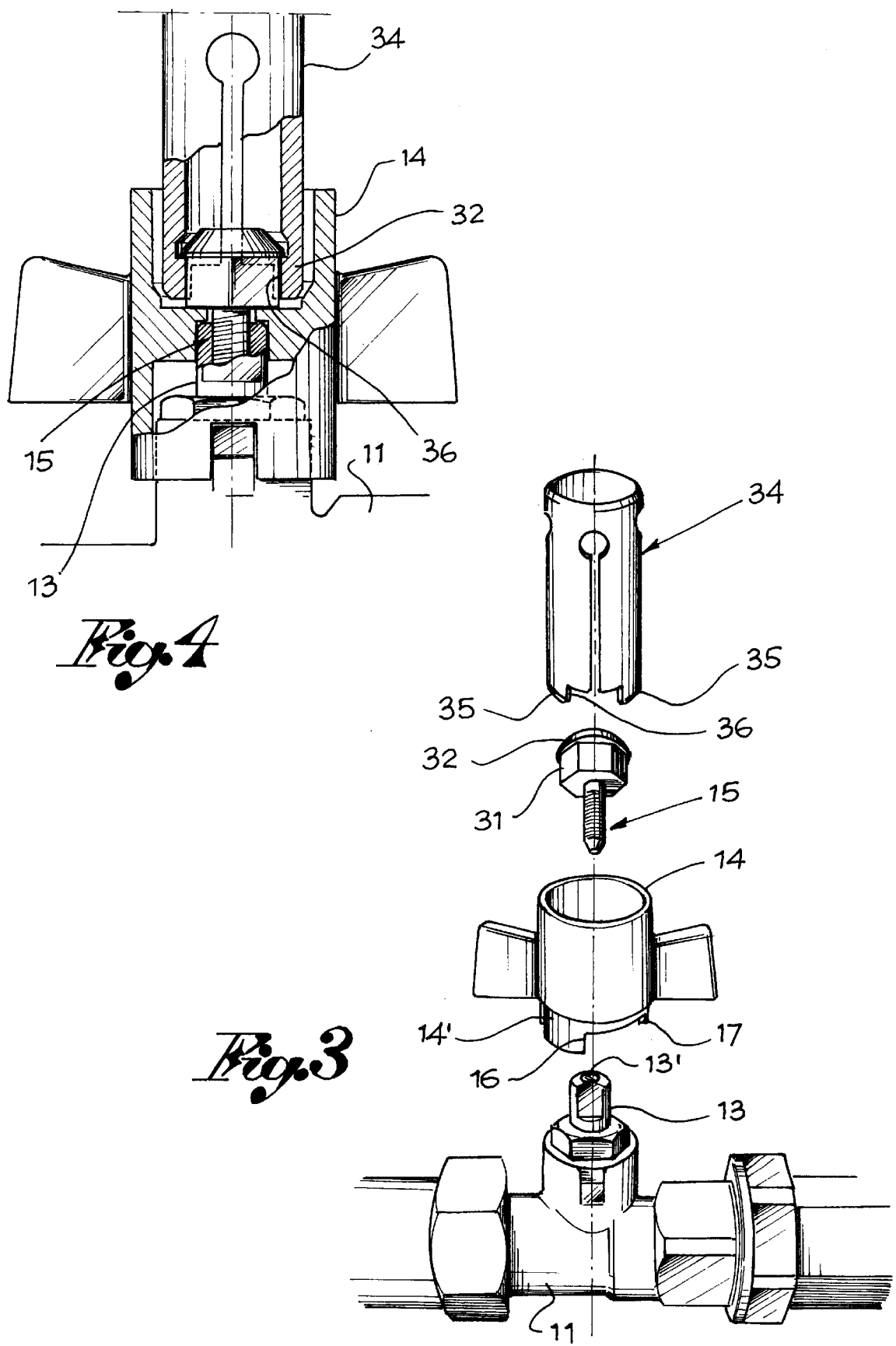

VALVE OR TAP WITH BLOCKING DEVICE FOR THE STOPPER

In general, this invention concerns valves or taps for the distribution of fluids, both liquid and gas, and, in particular, refers to a valve or tap with means for blocking its stopper in the open or closed position, as required as well as the means for such blockage.

Various systems for fluid distribution regularly use valves or taps with a stopper, usually round, that can rotate between an open and closed position by means of a control rod equipped with a throttle or grip lever. This throttle or grip lever for manoeuvring the valve is usually fixed to the stopper rod by means of a screw. Likewise, it has two shoulders, at an angle to each other, which are blocked, alternately, by a catch located on one side of the valve body, thereby defining the open and closed positions for the stopper.

For specific applications and/or to prevent tampering and/or accidental movements of the valve, especially with regard to gas supply, or to allow just qualified or authorised personnel to manoeuvre the valve, it is necessary for the stopper to be blocked in either an open or closed position. Furthermore, the blockage must be secure and non-reversible, except by use of the proper means or tool in the possession of the authorised personnel.

At present, such valves are blocked in the desired open or closed position by means of a cylinder lock, which is a device added on later and which is often both bulky and expensive.

Meanwhile, it is the aim of this invention to propose and construct a blocking device for said valves by using, more simply and preferably, certain incorporated parts of each valve, which, although specifically made, do not resort to additional means.

According to the invention, such an aim is achieved by blocking the rotation of the stopper, using the throttle or grip lever and the fastening screw of said throttle or lever on the control rod of the stopper. Therefore, on the one hand, the throttle or grip lever is equipped with at least one, but better two, locating and blocking notches, designed to interact, as required, with a catch incorporated within the valve body, so as to select and maintain an open or closed position for the valve stopper, and on the other hand, the fasting screw of the throttle or lever on the stopper control rod has a special head which allows it to be screwed or unscrewed only by means of a specific key for blocking and unblocking the throttle or lever, returning it to a position where it is possible to rotate the stopper again.

For this reason, when the valve is blocked in the open or closed position, as required, it cannot be moved accidentally or tampered with in an attempt to change the blocking condition and use the valve normally, without the use of the access key for the fastening screw.

Greater detail about the invention will become clear from the following description, in which reference is made to the examples in the enclosed drawings, where:

FIG. 3 shows a valve with throttle or grip lever and relative fastening screw, separately, according to another version and with the tool for tuning such a screw;

FIG. 4 shows a cross-section of the valve in FIG. 3, with the throttle or grip lever fixed to the rod and where the tool for tightening and untightening the screw is also shown;

Figure 1:
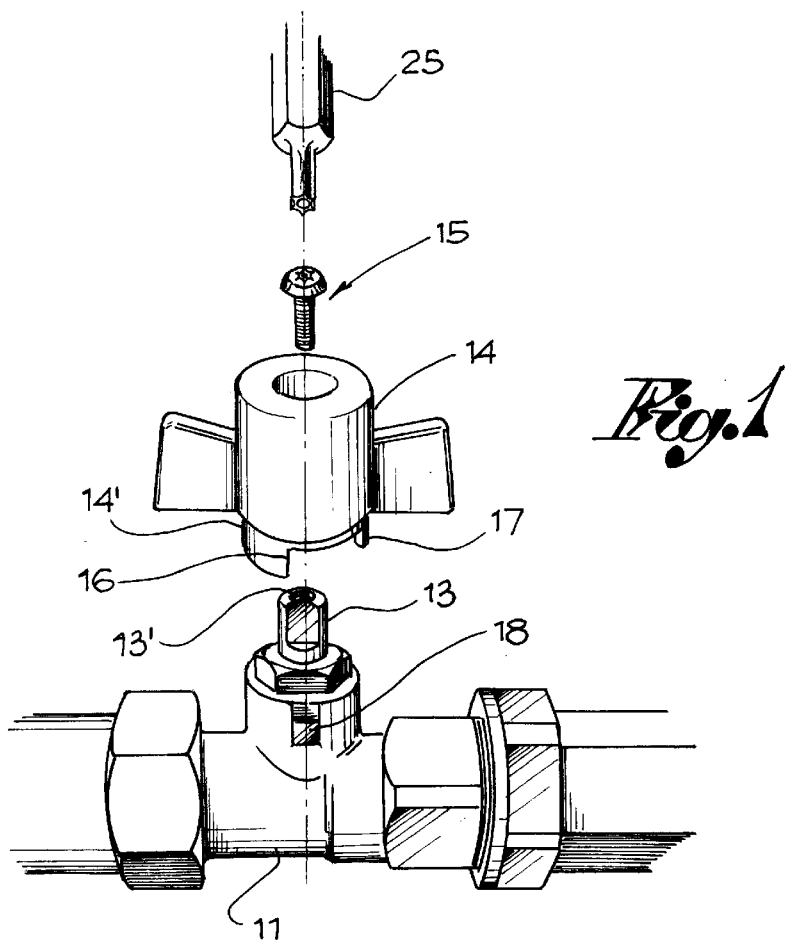
FIG. 1 shows separately a valve with throttle or grip lever and its respective fastening screw, according to a first version and with part of the tool for turning the screw.
Figure 5:
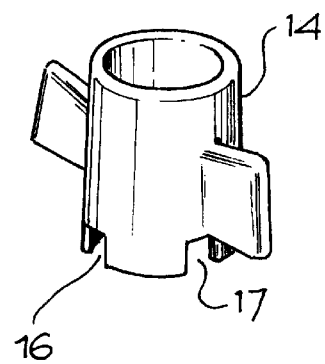
FIG. 5 shows the throttle or grip lever from another angle, with respect to FIGS. 1 and 3.

FIGS. 1 and 3 indicate a ball valve 11 which contains, as already known, a round stopper—not shown—to which there is connected a rotating rod 13, by means of which the stopper can be rotated by 90°, from an open to closed position of the fluid passage. This rotation is ensured by connecting a throttle or grip lever 14 to the rod 13. The throttle or grip lever 14 is fastened axially to said rod 13 by means of a fastening screw 15, which screws into a threaded hole 13', located at the top of the rod itself The throttle or grip lever 14, on a portion 14', concentric to the rod 13, has two end-of-turn shoulders 16, 17, which interact, alternately, with a catch 18 located on one side of the body 11, establishing the positions of maximum opening and closure of the valve stopper 12. On the sane portion 14' of the throttle or grip lever 14 that contains the end-of-turn shoulders 16, 17 there are also—see FIG. 5—two blocking notches 19, 20, at a distance from each other, both of which press firmly against the catch 18, preventing the throttle or grip lever and, thereby, the stopper from rotating.

A first notch 19 is designed to establish the permanently closed position of the stopper and, consequently, of the valve; the other notch 20 is designed to establish the permanently open position of the valve stopper.

Figure 6:
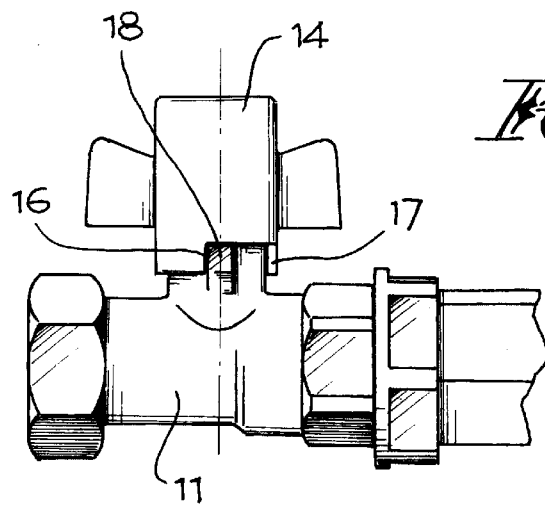
FIGS. 6, 7 and 8 show drawings of the valve in three different methods of use.
Figure 7:
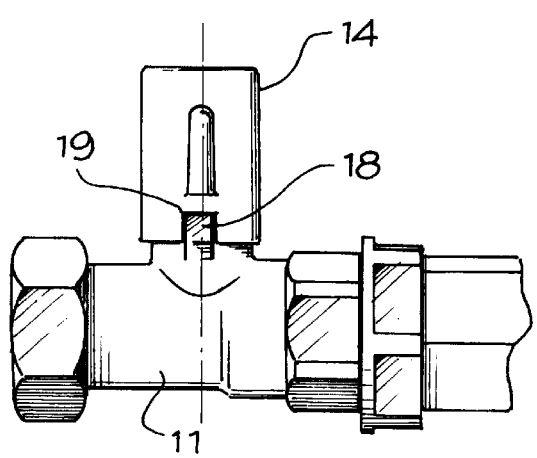
Figure 8:
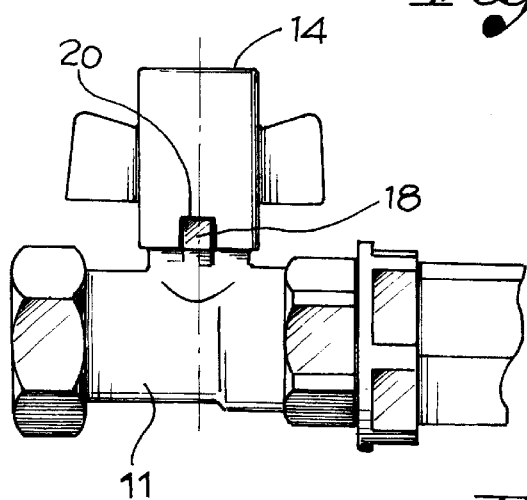

Essentially, when the fastening screw 15 is completely unscrewed, the throttle or grip lever 14 can be separated from the rotating rod 13. It may then be rotated around its own axis, coupled and fixed to the rod 13 in three different positions: a first position—FIG. 6—in which its end-of-turn shoulders 16, 17 are at opposite sides of the catch 18; a second position—FIG. 7—in which the first blocking notch 19 interacts with the catch 18; a third position—FIG. 8—in which the other blocking notch 20 interacts with the catch 18.

In the first position, the valve can be used normally. Its shutter can be rotated into the open and closed positions, as required, defined by the end-of-turn shoulders 16, 17. In the second position, the valve is kept constantly in the closed position. In the third position, the valve is kept constantly in the open position. In the second and third positions, the throttle or grip lever and, consequently, the stopper, are unable to rotate and prevent the valve from being used.

The fastening screw 15 serves to fasten the throttle or grip lever 14 to the rod 13 in each of the above-mentioned positions and, in addition, to prevent its being dismantled without authorisation, especially when the valve is in one of the open or closed blocking positions. To this end, the screw 15 is shaped so as to be screwed and unscrewed only by a specific tool in the possession of the person in charge, to prevent tampering or fraud.

Figure 2:
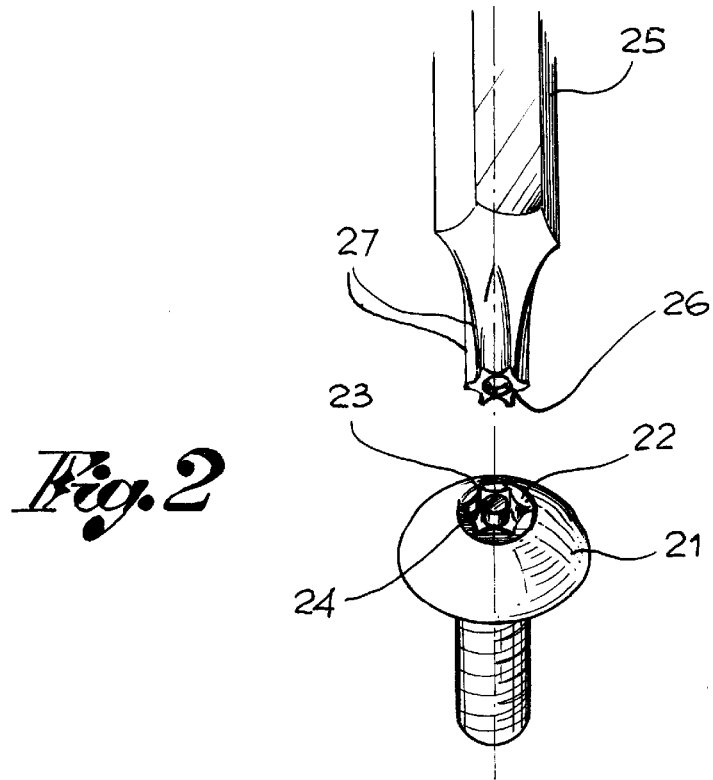
FIG. 2 shows, enlarged and in detail, the fastening screw represented in FIG. 1 and the tool for screwing/unscrewing it.

In one version, as shown in FIG. 1 and, in particular, in FIG. 2, the screw 15 has a head 21, the top of which has a central hollow 22, two, three or more radial grooves 23 around the hollow 22 and a projection 24 that rises from the base, in the centre of said hollow. This projection 24 from the base prevents access to and use of the grooves 23 on the head of the screw for the purpose of turning the screw with a normal screwdriver or common polygonal key. Therefore, access to the grooves 23 for tuning the screw is only possible with a key or tool 25 that matches not only the grooves 23, but also the projection 24 in the hollow in the screw head. A suitable key 25 is shown as an example in FIGS. 1 and 2.

It has a functional end which is designed to be inserted into the hollow 22, with a central hole 26 intended to receive the projection 24 from the bottom of said hollow and various radial ribs 27 that insert into the grooves 23, for screwing and unscrewing the screw 15, as required.

In another version, as shown in FIGS. 3 and 4, the fastening screw has a polygonal head 31, surmounted by a dome 32, which may be semi-spherical, a truncated cone or other shape, with a base 33 wider than the polygonal surface 31 of the head. The overhanging base 33 of the dome 32 prevents access to the polygonal head 31 of the screw for the rotation of the latter by means of the usual polygonal tubular key, also because said screw head is sunk within the top of the throttle or grip lever. Therefore, access to the polygonal head 31 of the fastening screw 15 is possible only with a tool 34, as shown in FIGS. 3 and 4, which has at least two jaws 35, each with a flat internal part 36, corresponding to a face on the polygonal head of the screw. The jaws 35 of the tool are elastic, in such a way as to stretch around the protruding base 33 of the dome 32 when the tool is forcibly pushed onto the head of the screw, and to grip the faces of the polygonal screw head with their flat internal parts 36 to make it turn. Conversely, the tool can be separated from the head of the screw by forcibly removing it.

It is therefore clear that the state of the valve during normal use or for the period of permanent opening or closing must be the responsibility solely of the person in charge of the proper key or tool that turns the fastening screw, which represents the element intended to prevent tampering with the valve whenever the latter doesn't need to be used in its normal position.

Figure 9:
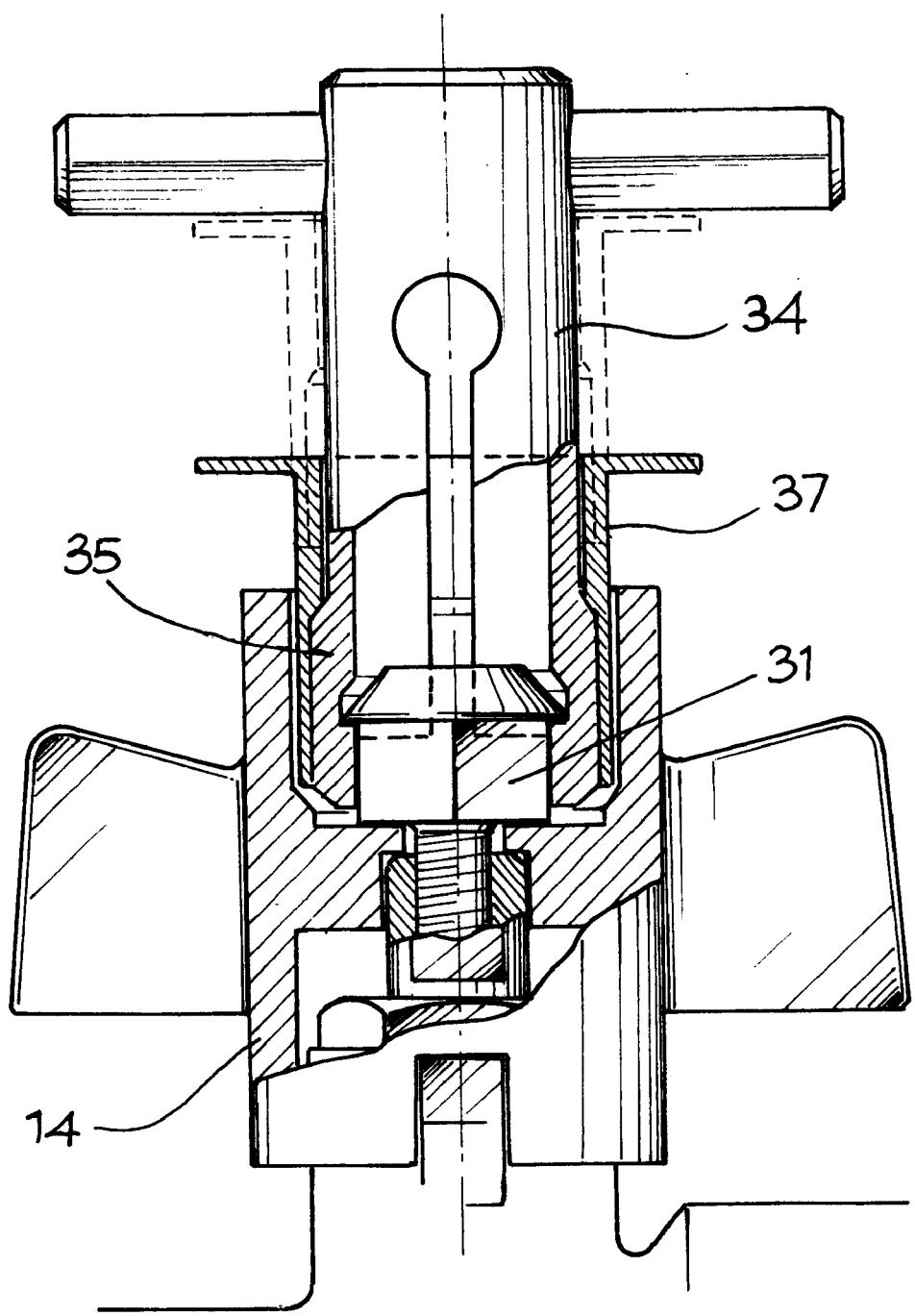
FIG. 9 shows a pincer tool with an anti-expansion bushing.

The jaws of the tool 34 could open apart with the force applied to turn the screw. To prevent this, the tool can be furnished with a bushing 37, which lowers over the jaws 35 at the moment of turning the screw, as shown in FIG. 9.

What is claimed is:

1. Valve or tap for fluids, consisting of a body, a stopper in said body that rotates between an open and closed position, a control rod for said stopper equipped with a throttle or grip lever, where said throttle or grip lever is fixed to said rod by means of a fastening screw and has, on one of the parts that are concentric to said rod, two end-of-turn shoulders, set at an angle, which come to rest against a catch on one side of said body, in order to define the open and closed positions of the stopper, characterised by the fact that the throttle or grip lever (14) has, in addition, on said part with the end-of-turn shoulders, at least one blocking notch (19, 20), designed to fit tightly with the said catch (18), in order to keep the throttle or lever and, with it the stopper, in a pre-determined fixed position, either closed or open, to prevent it from turning, and by the fact that said fastening screw (15) has a special head that allows it to be screwed/ unscrewed only with a specific key or tool in order to block the throttle or lever, thereby preventing tampering, at least when the stopper has to stay in a fixed position.

2. Valve or tap according to claim 1, in which the fastening screw (15) has a polygonal head (31) surmounted by a dome (32) with a base (33) that overhangs the outer edge of the polygonal head, and in which the tool (34) for turning said screw has at least two elastic jaws (35) that can stretch axially to pass over the protruding base of the dome on the screw head and then tighten around the outer edge of the polygonal head of the screw, the tool being equipped with a busing (37) to prevent the jaws being forced apart under pressure.

3. Valve or tap according to claim 1, in which the fastening screw (15) has a head (21) with atop that has a central hollow (22), several radial grooves (23) around said hollow and a projection (24) rising from the bottom and in the center of said hollow, and in which the tool (25) for turning said screw has a functional end designed to be inserted into said hollow (22), with a central hole (26) for receiving said projection (24) from the bottom and radial ribs (27) which enter the radial grooves (23) on the top of the screw.

4. Valve or tap according to claim 1, in which said throttle or grip lever (14) has two blocking notches (19, 20), interacting alternately with the catch (18), one notch (19) being designed for blocking the stopper in the permanently closed position, the other notch (20) for blocking the stopper in the permanently open position of the valve or tap.

5. Valve or tap according to claim 4, in which the fastening screw (15) has a head (21) with a top that has a central hollow (22), several radial grooves (23) around said hollow and a projection (24) rising from the bottom and in the center of said hollow, and in which the tool (25) for turning said screw has a functional end designed to be inserted into said hollow (22), with a central hole (26) for receiving said projection (24) from the bottom and radial ribs (27) which enter the radial grooves (23) on the top of the screw.

6. Valve or tap according to claim 4, in which the fastening screw (15) has a polygonal head (31) surmounted by a dome (32) with a base (33) that overhangs the outer edge of the polygonal head, and in which the tool (34) for turning said screw has at least two elastic jaws (35) that can stretch axially to pass over the protruding base of the dome on the screw head and then tighten around the outer edge of the polygonal head of the screw, the tool being equipped with a busing (37) to prevent the jaws being forced apart under pressure.

* * * * *